(12) United States Patent
Kuo

(10) Patent No.: US 7,172,327 B2
(45) Date of Patent: *Feb. 6, 2007

(54) LIGHT-GUIDE-PLATE STRUCTURE

(76) Inventor: Heng-Sheng Kuo, P.O. Box 26-757, Taipei 106 (TW)

( * ) Notice: Subject to any disclaimer, the term of this patent is extended or adjusted under 35 U.S.C. 154(b) by 145 days.

This patent is subject to a terminal disclaimer.

(21) Appl. No.: 10/982,047

(22) Filed: Nov. 8, 2004

(65) Prior Publication Data
US 2006/0098453 A1 May 11, 2006

(51) Int. Cl.
F21V 7/04 (2006.01)
(52) U.S. Cl. .................. 362/609; 362/603; 362/612; 362/615; 362/623
(58) Field of Classification Search ............. 362/612, 362/613, 614, 615, 609, 603, 610, 623
See application file for complete search history.

(56) References Cited

U.S. PATENT DOCUMENTS

| 6,193,392 | B1* | 2/2001 | Lodhie | 362/235 |
| 2005/0117319 | A1* | 6/2005 | Kuo | 362/31 |
| 2006/0158902 | A1* | 7/2006 | De Vaan | 362/622 |

* cited by examiner

Primary Examiner—Renee Luebke
Assistant Examiner—Zahra I. Bennett
(74) Attorney, Agent, or Firm—Rosenberg, Klein & Lee

(57) ABSTRACT

A light-guide-plate structure has a light guide plate, an LED module disposed on at least one side of the light guide plate, and a reflection member disposed between the LED module and the light guide plate. The LED module includes a circuit board and a plurality of LEDs arranged on the circuit board. The reflection member covers the side and a bottom surface of the light guide plate. The reflection member has a plurality of openings corresponding to the LEDs of the LED module in order to enable the LEDs to face the side of the light guide plate.

8 Claims, 7 Drawing Sheets

LIGHT-GUIDE-PLATE STRUCTURE

BACKGROUND OF THE INVENTION

1. Field of the Invention

The present invention relates to a light-guide-plate structure, and particularly relates to a light-guide-plate structure that saves labor and time.

2. Background of the Invention

A backlight module is a kind of backlight used to supply supplying for a liquid crystal such as that in, for example, a liquid crystal display in the panel of a cell phone or a PDA (Personal Digital Assistance), which is currently a popular product. Based on the principle of the backlight module, a spontaneous light source is provided for a light guide plate, such as a CCFL (Cold Cathode Fluorescent Lamp), or an LED (Light-Emitting Diode), so as to create a larger and more uniform surface illumination. A reflector arranged in the backlight module is used to reflect the light from the spontaneous light source, in order to convert the light into the light guide plate for the surface illumination. Light weight, simple structure, excellent view angle, high efficiency of the light, and high uniform light distribution and high brightness are advantages of the backlight. During a conventional assembly process, the spontaneous light source is disposed next to a respective side of the light guide plate, and with the exception of the side with the light source and the illuminating surface for illumination, a plurality of reflectors with high reflectivity are connected to the remaining sides and surface of the light guide plate via sticks in order to maintain the illumination of the illuminating surface.

Reference is made to FIGS. 1A and 1B, in which a conventional light-guide-plate structure is illustrated, including a light guide plate 1a, an LED module 2a disposed at a side of the light guide plate 1a, and a reflector 3a covering a bottom surface of the light guide plate 1a. The conventional light-guide-plate structure can further include a CCFL 4a opposite the LED module 2a for increasing the illumination thereof. The reflector 3a can further extend from the bottom surface of the light guide plate 1a forwards to the LED module 2a and the CCFL 4a, or further extends upwardly to part of the top surface of the light guide plate 1a for wrapping the light guide plate 1a. Furthermore, the light guide plate 1a can include a recess corresponding to the CCFL 4a for the reception of the CCFL 4a. The conventional light-guide-plate structure can be further used with a diffuser sheet, a polarization sheet or optical components similar to the backlight module. The LED light module 2a includes a circuit board 20a and a plurality of LEDs 21a arranged on the circuit board 20a. Before the LED light module 2a is arranged on the light guide plate 1a, a reflector 22a is pre-stuck on the circuit board 20a between the circuit board 20a and the light guide plate 1a. Because the light absorption by the circuit board 20 depends on the material and the reflectivity thereof, the illumination of the light guide plate 1a will certainly decrease. Therefore, the reflector 22a is used to avoid illumination problems.

However, the step of the arrangement of reflector 22a on the circuit board 20a is prior to the step of assembling the LED module 2a on the light guide plate 1a. Without mentioning how many types and number of the reflector 3a and taking only one reflector 3a into consideration, at least two steps are required to stick the reflectors on the light guide plate 1a (one is reflector 22a, and the other is reflector 3a). These two steps are similar but not continuous. If the amount of the reflectors increases or the design of the reflector is complex, time is wasted and labor will increase.

SUMMARY OF THE INVENTION

The primary objective of the invention is therefore to specify a light-guide-plate structure that saves time and labor but still maintains the illumination thereof.

According to the invention, the objective is achieved by a light-guide-plate structure that includes a light guide plate, an LED module disposed on at least one side of the light guide plate, and a reflection member disposed between the LED module and the light guide plate. The LED module includes a circuit board and a plurality of LEDs arranged on the circuit board. The reflection member covers the side and a bottom surface of the light guide plate. The reflection member has a plurality of openings corresponding to the LEDs of the LED module in order to enable the LEDs to face the side of the light guide plate.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1A:
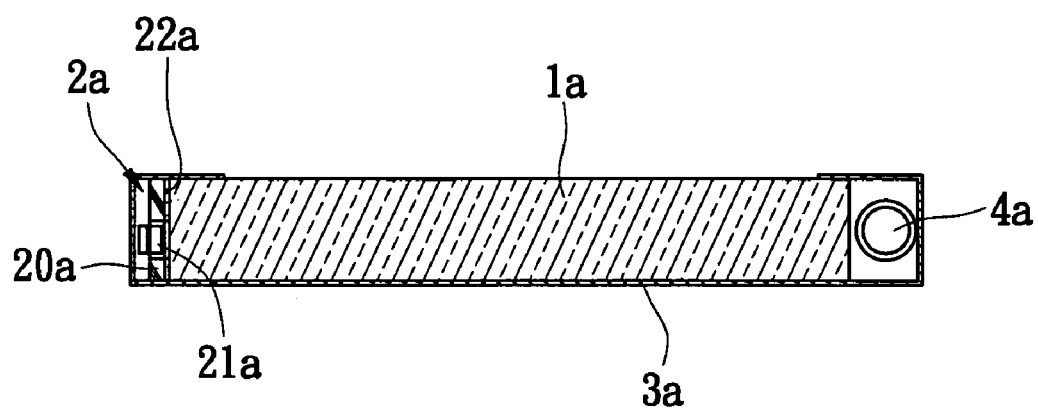
FIG. 1A is a cross-sectional profile according to the conventional light-guide-plate structure.
Figure 1B:
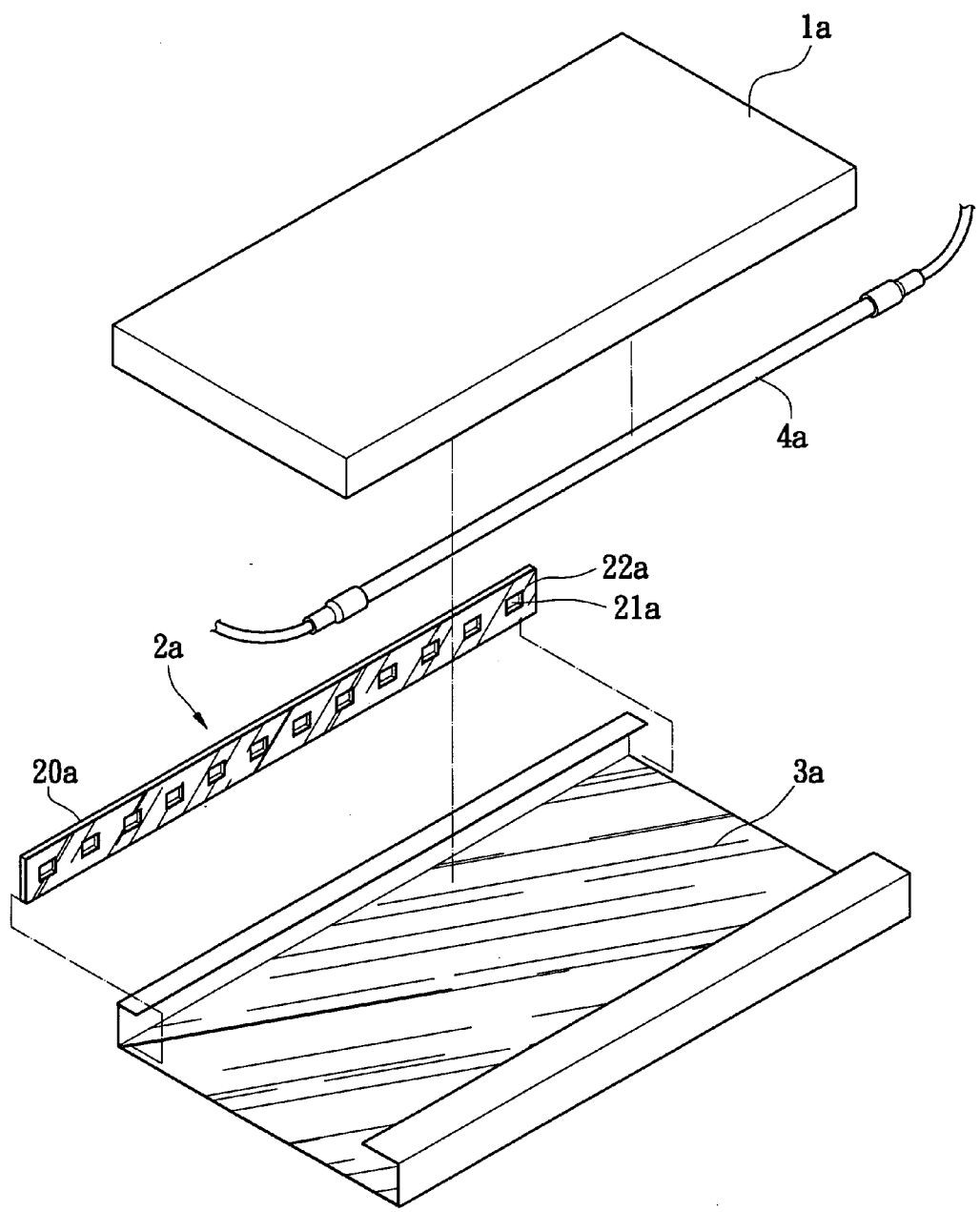
FIG. 1B is a decomposition view according to the conventional light-guide-plate structure.
Figure 2A:
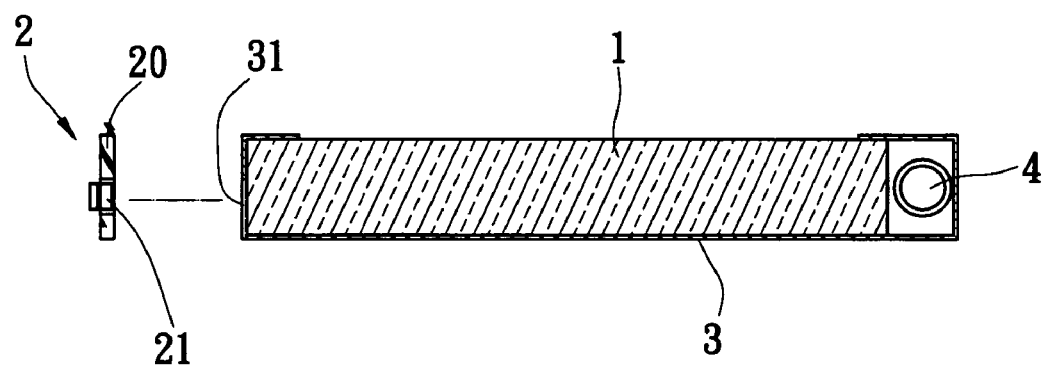
FIG. 2A is a cross-sectional profile according to a light-guide-plate structure of the present invention.
Figure 2B:
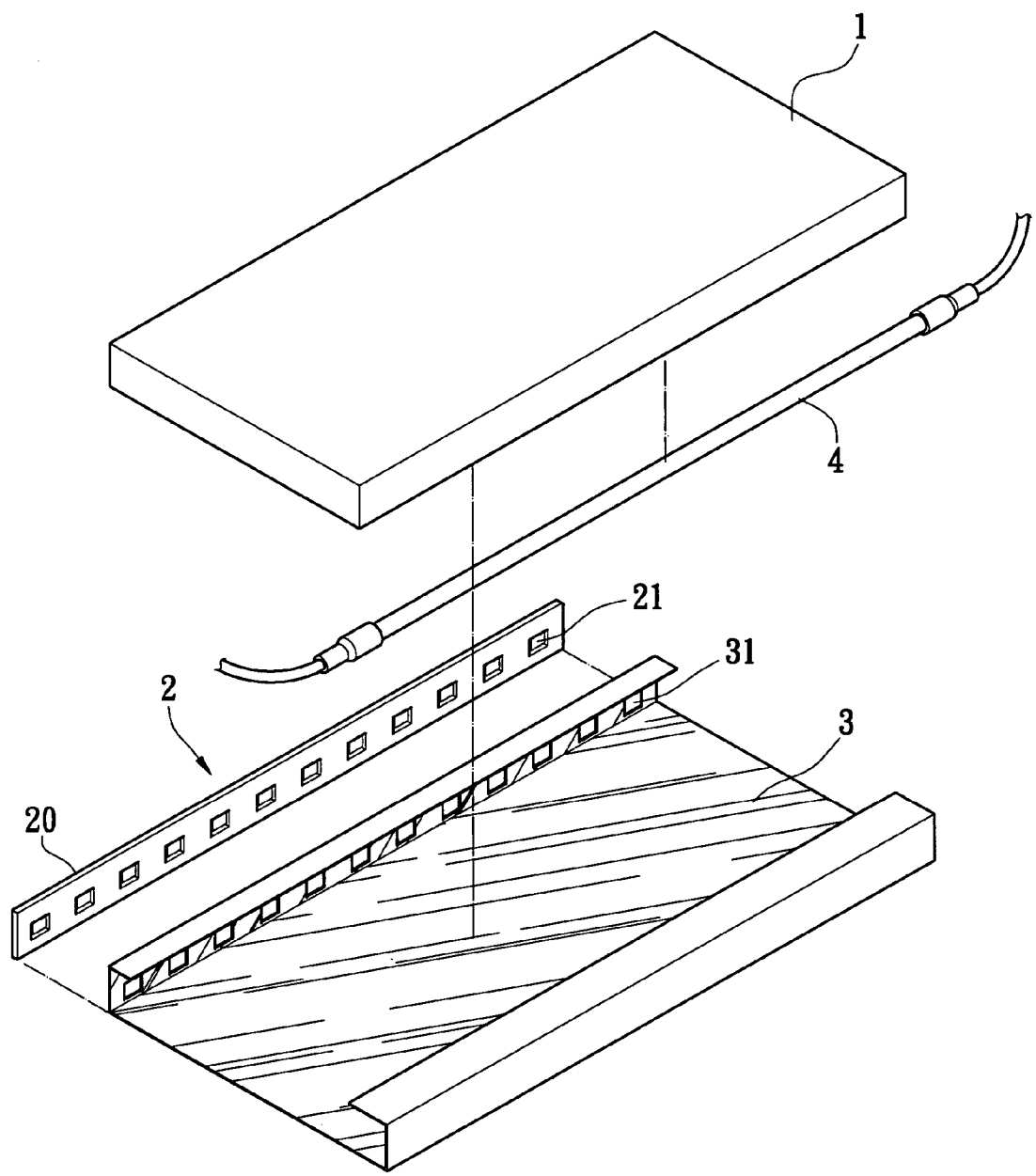
FIG. 2B is a decomposition view according to the light-guide-plate structure of the present invention.

With respect to FIGS. 2A and 2B, a light-guide-plate structure according to the present invention includes a light guide plate 1, an LED (Light-Emitting Diode) module 2 disposed on at least one side of the light guide plate 1, and a reflection member 3 disposed between the LED module 2 and the light guide plate 1. The LED module 2 includes a circuit board 20 and a plurality of LEDs 21 arranged on the circuit board 20. The reflection member 3 at least covers the side and a bottom surface of the light guide plate 1. The reflection member 3 can be formed integrally in one piece;

or the reflection member 3 can be separated to be attachable. The reflection member 3 has a plurality of openings 31 corresponding to the LEDs 21 of the LED module 2, respectively, in order to enable the LEDs 21 to face the side of the light guide plate 1. Therefore, a step of arranging the reflector 22a on the LED module 2 can be omitted. Not only can the process be shortened, but the assembly process will be more fluent, because most steps of adhering reflectors return to the original station, and if these steps can be eliminated, the product can go to the next station quickly and fluently. In addition, the reflection member 3 can be made (or punched) with the openings 31, which sizes can correspond to the LEDs 21. Omission of the adhesion can make the LED module 2 close to the light guide plate 1 to avoid the possibility of light dissipation. The objective of maintaining lighting efficiency while saving time and labor can be achieved.

Figure 4:
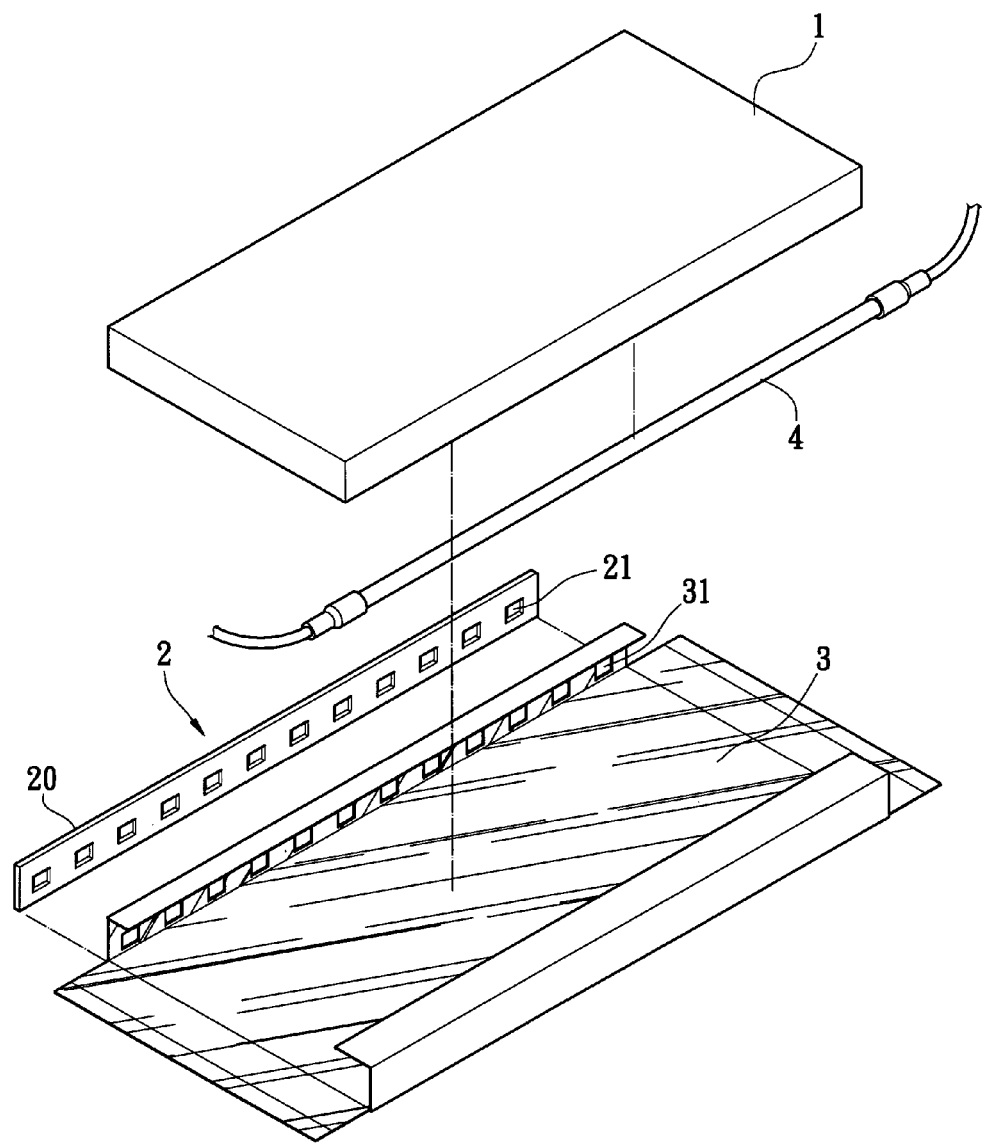
FIG. 4 is a decomposition view according to another embodiment of the light-guide-plate structure of the present invention.

The reflection member 3 can extend to cover completely the opposite side of the light guide plate 1; in particular, the reflection member 3 can extend from the LED module 2 to part of a top surface of the light guide plate 1 to prevent a decrease in illumination and uniformity due to light dissipation. The light-guide-plate structure can further include a lamp, and, in particular, a CCFL (Cold Cathode Fluorescent Lamp), disposed opposite the LED module 2. The light guide plate 1 has a recess formed to receive the lamp. The reflection member 3 extends forwards the lamp or to part of the top surface of the light guide plate 1. Furthermore, the reflection member 3 extends laterally to cover two lateral sides of the light guide plate 1, or to part of the top surface of the light guide plate 1 (see FIG. 4). In another embodiment according to the present invention (not shown), two LED modules 2 can be disposed on opposite sides of the light guide plate 1, parallel to each other; or the two LED modules 2 can be disposed on adjacent sides of the light guide plate 1 in an L-shape. The reflection member 3 also includes corresponding openings 31 formed thereon. This means the openings 31 cannot be formed on only one side of the reflection member 3.

The reflection member 3 is a reflector sheet, which can be arranged on the light guide plate 1 via adhesive. The reflection member 3 can extend two sides (or four sides) of the light guide plate 1, and between the side and the bottom surface of the light guide plate 1, the reflection member 3 provides a foldable line, which is formed simultaneously with the openings to save time. Another embodiment of the reflection member 3 can be an optical film with low transmittance; the optical film can be coated on the side of the light guide plate 1 with the openings 31 in advance, and in this way unifies the light guide plate with the reflection member 3.

Figure 3A:
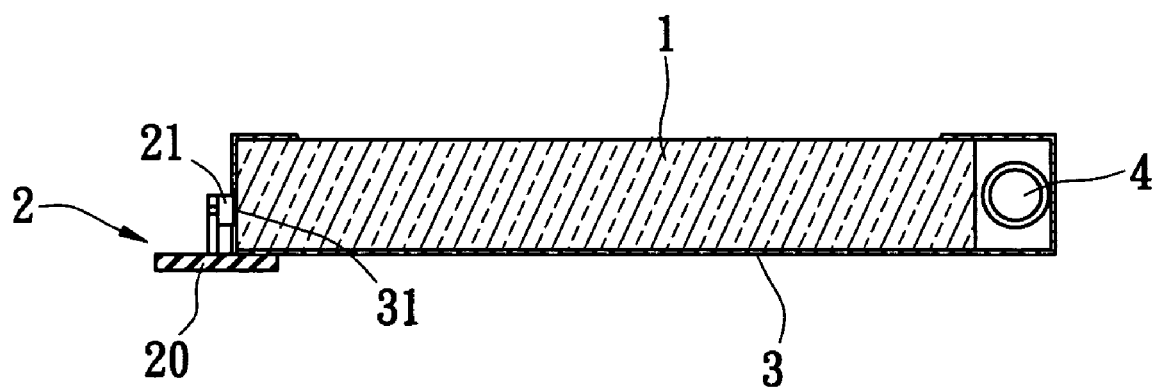
FIG. 3A is a cross-sectional profile according to an embodiment of the light-guide-plate structure of the present invention.
Figure 3B:
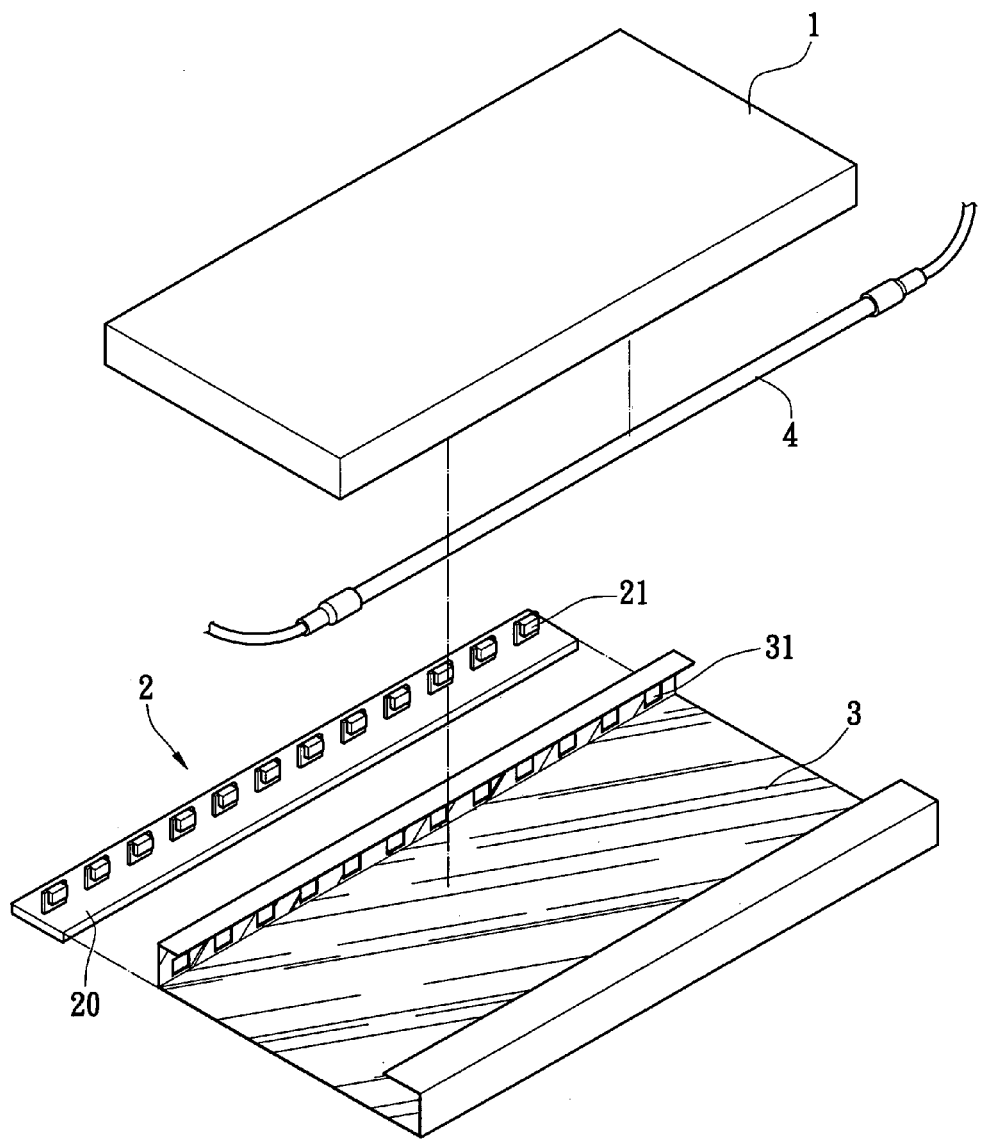
FIG. 3B is a decomposition view according to the embodiment of the light-guide-plate structure of the present invention.

FIG. 2B illustrates the circuit board 20 disposed parallel to the side of the light guide plate 1. This means the LEDs 21 can lie on the circuit board 20. FIG. 3B shows the circuit board 20 disposed perpendicular to the side of the light guide plate 1. This means the LEDs 21 can stand on the circuit board 20.

Obviously, the light-guide-plate structure according to the present invention indeed has some advantages. The reflection member, with the openings corresponding to the LEDs, disposed on the light guide plate really saves time and labor, and smoothes the processes and the movement of the operators. The light-guide-plate structure according to the present invention provides the reflection member 3, covers the circuit board completely with the exception of the LEDs, and guarantees the lighting efficiency of the light guide plate.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light-guide-plate structure, comprising:
   a light guide plate;
   an LED module disposed on at least one side of the light guide plate, the LED module including a circuit board and a plurality of LEDs arranged on the circuit board; and
   a reflection member disposed between the LED module and the light guide plate, and covering the side and a bottom surface of the light guide plate;
   wherein the reflection member has a plurality of openings corresponding to the LEDs of the LED module in order to enable the LEDs to face the side of the light guide plate.

2. The light-guide-plate structure as claimed in claim 1, wherein the reflection member extends to cover completely an opposite side of the light guide plate.

3. The light-guide-plate structure as claimed in claim 2, wherein the reflection member extends laterally to cover two lateral sides of the light guide plate.

4. The light-guide-plate structure as claimed in claim 1, wherein the reflection member is a reflector sheet.

5. The light-guide-plate structure as claimed in claim 4, wherein the reflection member has a foldable line between the bottom surface and the side of the light guide plate.

6. The light-guide-plate structure as claimed in claim 5, wherein the openings are formed simultaneously with the foldable line.

7. The light-guide-plate structure as claimed in claim 1, wherein the circuit board is disposed parallel to the side of the light guide plate.

8. The light-guide-plate structure as claimed in claim 1, wherein the circuit board is disposed perpendicular to the side of the light guide plate.

* * * * *